US006917717B2

(12) United States Patent
Simard et al.

(10) Patent No.: US 6,917,717 B2
(45) Date of Patent: Jul. 12, 2005

(54) SYSTEM AND METHOD FOR IMAGE COMPRESSION USING WAVELET CODING OF MASKED IMAGES

(75) Inventors: Patrice Y. Simard, Bellevue, WA (US); Henrique S. Malvar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 655 days.

(21) Appl. No.: 10/107,756

(22) Filed: Mar. 26, 2002

(65) Prior Publication Data

US 2003/0185454 A1 Oct. 2, 2003

(51) Int. Cl.[7] .............................................. G06K 9/36
(52) U.S. Cl. ...................................... 382/240; 382/248
(58) Field of Search ........................ 382/240, 244–248; 375/240.19; 348/398.1, 408.1

(56) References Cited

U.S. PATENT DOCUMENTS 5,764,805 A * 6/1998 Martucci et al. ............ 382/238
6,058,214 A * 5/2000 Bottou et al. ............... 382/240

OTHER PUBLICATIONS

R. L. de Queiroz, "Compression of compound documents," Proc. IEEE International Conf. on Image Processing, Kobe, Japan, Oct. 1999.
B. G. Haskell, P. G. Howard, Y. A. LeCun, A. Puri, J. Ostermann, M. R. Civanlar, L. R. Rabiner, L. Bottou, and P. Haffner, "Image and video coding—emerging standards and beyond," *IEEE Transactions on Circuits and Systems for Video Technology*, vol. 8, Nov. 1998, pp. 814–837.
H. S. Malvar, "Fast Adaptive Encoder for Bi–Level Images," *IEEE Data Compression Conf.*, Snowbird, UT, Mar. 2001.
R. L. de Queiroz, "On data filling algorithms for MRC layers," *Proc. IEEE International Conf. on Image Processing*, Vancouver, Canada, Sep. 2000.
H. Chen, M. R. Civanlar, and B. G. Haskell, "A block transform coder for arbitrary shaped image segments," *Proc. IEEE International Conf. on Image Processing*, Austin, TX, pp. 85–89, Nov. 1994.
P. Haffner, L. Bottou, P. G. Howard, P. Simard, Y. Bengio, and Y. Le Cun, "Browsing through high quality document images with DjVu," *Proc. IEEE International Forum on Research and Tech. Advances in Digital Libraries*, Santa Barbara, CA, pp. 309–318, Apr. 1998.
I. Daubechies, I. Guskov, P. Schröeder, and W. Sweldens, "Wavelets on Irregular Point Sets," *Phil. Trans. R. Soc. Lond. A*, to appear.

(Continued)

*Primary Examiner*—Bhavesh M. Mehta
*Assistant Examiner*—Duy M. Dang
(74) *Attorney, Agent, or Firm*—Lyon & Harr, LLP; Mark A. Watson

(57) ABSTRACT

Compression of images that have masked or "don't care" regions which are delineated by a binary image mask is achieved using "masked wavelet transforms." A unique mask-dependent lifting scheme is used to compute invertible wavelet transforms of the input image for use in encoding and decoding the input image. These mask-dependent wavelet transforms are derived from the input image based on the masked regions within the image. Masked wavelet coding automatically generates an appropriate linear combination of available, unmasked, neighboring pixels, for both the prediction and the update steps of "lifting" for each pixel. This pixel availability is then used to change the wavelet function on a case-by-case basis as a function of the mask by using a polynomial of degree k–1 for interpolation in both the predict and update steps of lifting where at least k unmasked neighboring pixel values are available.

29 Claims, 8 Drawing Sheets

OTHER PUBLICATIONS

M. Eck, T. DeRose, T. Duchamp, H. Hoppe, T. Lounsbery, and W. Stuetzle, "Multiresolution analysis of arbitrary meshes," *Proc. ACM Computer Graphics (SIGGRAPH)*, Los Angeles, CA, pp. 173–182, Aug. 1995.

W. Sweldens, "The Lifting Scheme: A new philosophy in biorthogonal wavelet constructions" in A. F. Laine and M. Unser, eds., *Wavelet Applications in Signal and Image Processing III*, pp. 68–79, Proc. SPIE 2569, 1995.

G. Davis, S. G. Mallat, and Z. Zhang, "Adaptive time–frequency decompositions," *Optical Engineering*, vol. 33, pp. 2183–2191, Jul. 1994.

H. S. Malvar, "Fast progressive wavelet coding," *Proc. IEEE Data Compression Conf.*, Snowbird, UT, pp. 336–343, Mar. 1999.

\* cited by examiner

SYSTEM AND METHOD FOR IMAGE COMPRESSION USING WAVELET CODING OF MASKED IMAGES

BACKGROUND

1. Technical Field

The invention is related to a system for compression of images that have masked or "don't care" regions which are delineated by a binary image mask, and in particular, to a system for encoding and decoding of an image using wavelet transforms which are functions of the binary mask.

2. Related Art

There are several existing schemes for compressing masked images. In general, a masked image is an image having holes or missing pixels which are defined by a binary image or "mask." Such masked images are often used with clipart or "cut-outs", where images of arbitrary shapes are used for pasting onto other images. In addition, another type of masked image is frequently seen with general composite documents, where text or lines are superimposed on an image. Such text and lines typically have relatively high frequencies relative to the underlying image. Consequently, existing image compression schemes typically achieve poor compression of such composite images.

The basic problem in compressing masked images is to maximize image compression given an input image that is to be compressed, along with a mask which indicates for each pixel in the input image whether the pixel is visible, i.e., not covered by the mask, or whether it is not visible, i.e., covered by the mask.

Conventional solutions to this basic compression problem typically fall into two categories. The first is to fill the data that is masked with "hallucinated" data (i.e., data used to fill don't care regions of an image to assist in compressing the image), and then use a regular image compression technique. The simplest way to fill the missing data is to fill it with the image average. However, schemes based on such filling techniques are not very efficient because they tend to creates sharp discontinuities at the mask boundaries. Further, such discontinuities at the mask boundaries not only increase the required bit rate for a given peak signal-to-noise ratio (PSNR), but also produce noticeable ringing near the mask boundaries.

Related schemes color each pixel with the color of the closest non-masked pixel. Standard morphology algorithms allow such color filling to be performed with only two passes over all the pixels, leading to "Voronoi-filled" regions under the mask. Next, the reconstructed image is low-passed and then the known pixels are restored to their correct values. However, if the lowpass filter cutoff frequency is too low, discontinuities and ringing at the mask boundaries are again seen, while if the cutoff frequency is too high, sharp edges of the Voronoi diagrams will consume too many bits, thereby resulting in reduced compression efficiency. However, advantages to this approach include the fact that it is very simple to implement and computationally efficient.

Another conventional approach to the problem is to use projection onto convex set (POCS). This is the approach used in systems such as the well known "DjVu" scheme. In general, the DjVu scheme considers two convex sets: a set of images that matches the input on the visible pixels, and a set of images that have certain wavelet coefficients set to zero (e.g. all high-frequency coefficients beyond a certain resolution level). By alternating projection on those two sets, one can find an image that agrees with the visible pixels, and which compresses well because it has many zero wavelet coefficients.

The second category of solutions to the basic compression problem noted above use wavelet transforms designed explicitly for irregular grids. Given a masked image, the set of unmasked pixels can be considered as an irregular sampling grid because a number of pixels in the input image are masked, and thus not sampled for compression. However, conventional techniques based on irregular grids are directed towards smooth data interpolation rather than maximization of compression performance.

Therefore, what is needed is a system and method for maximizing compression performance for masked images while avoiding color filling of masked pixels which can result in discontinuities and ringing at the mask boundaries and reduced compression efficiency.

SUMMARY

Image compression using masked wavelet coding involves a new system and method which solves the aforementioned problems, as well as other problems that will become apparent from an understanding of the following description by providing a novel system for compression of images that have masked or "don't care" regions which are delineated by a binary image mask. This binary mask simply indicates whether each pixel in an input image is masked or visible. A unique mask-dependent lifting scheme is used to compute invertible wavelet transforms from the input image for use in encoding and decoding the input image. These mask-dependent wavelet transforms are derived from the input image based on the masked regions within the image. In other words, the wavelet transforms are a function of the binary mask.

In general, a system and method for image compression using masked coefficients locally adapts these coefficients as a function of the mask applied to the input image, and then uses a standard wavelet or linear transform. Consequently, unlike conventional schemes using lifting for computing wavelets, the masked wavelet coding described herein intentionally ignores masked or don't-care pixel values within the input image rather than first filling or estimating pixel values for such regions as do the conventional schemes.

Conventional lifting schemes are well known to those skilled in the art. Consequently, conventional lifting will be described only briefly before describing in detail the adaptations which allow lifting to be applied to irregular grids such as masked images. In general, "lifting" is an algorithm which is used to efficiently calculate wavelet transforms without the use of Fourier transforms. The wavelet transform of a signal, such as an image, is a multi-resolution representation of that signal where the wavelets are the basis functions which at each resolution level decorrelate the signal. In the conventional lifting scheme, a wavelet transform can be decomposed as a succession of prediction steps for a highpass filter and update steps for a lowpass filter, performed at each resolution level. Typically 4 to 6 lifting stages are used, however, either more or less stages can be used as desired. Further, with traditional lifting, in computing a wavelet transform, each prediction step computes a linear function of a predetermined set of neighboring pixels to predict the current pixel. However, because traditional lifting requires a predetermined set of neighboring pixels to predict the current pixel, it is unsuitable for predicting pixels in irregular grids such as masked images having masked or don't-care regions in place of one or more pixels.

This limitation is successfully addressed by using masked wavelet coding as described herein. In particular, masked wavelet coding automatically generates an appropriate linear combination of available, unmasked, neighboring pixels, for both the prediction and the update steps, for each pixel at each lifting stage. At each pixel location, the mask creates a pattern of availability, which must then be converted into the correct linear combination of the available pixel values. For example, assuming an unmasked image, using a traditional cubic wavelet to predict a neighboring pixel requires three known neighboring pixels. However, assuming that any of those neighboring pixels is masked, computing a traditional cubic wavelet via lifting will no longer work because the result would depend on missing values, e.g., on masked pixels. Setting the missing values to some constant (zero, match to neighbors, or some average over the whole image, etc.) can introduces sharp discontinuities, which translate into poor compression and/or undesirable artifacts.

Consequently, the masked wavelet approach described herein changes the wavelet function on a case-by-case basis as a function of the mask. In particular, for each stage of lifting, during the prediction step of lifting, if k values are available for the prediction, a polynomial of degree k−1 is used for the interpolation. For example, where only three neighboring pixel values are available, a quadratic polynomial is tised instead of a cubic polynomial. Similarly, if two neighborhood pixel values are available, a linear polynomial is used instead of a cubic or quadratic polynomial. If only one value is available, a constant polynomial is used, and the wavelet becomes a conventional "Haar wavelet." Note that if the signal is a polynomial of degree k−1 and k neighboring pixels are not masked, the prediction is perfectly accurate.

Similarly, for each stage of lifting, in the lifting update step, one or more pixels of the input image are again masked. Consequently, the order of the polynomial available for update is again determined based on how many unmasked pixels are available for the update step.

Note that in the absence of a mask, with conventional lifting, a 2D wavelet transform is computed over the 2D image by a performing a succession of 1D wavelet transforms. This is possible because the 2D filter is separable and can be done using two 1D filters. However, a binary mask is not generally separable. Therefore, computation of the 2D masked wavelet using a succession of 1D masked wavelet transforms serves to provide a close, but not perfect, approximation of the 2D transform needed for the 2D image. In a tested embodiment which computes the 2D masked wavelet using a succession of 1D masked wavelet transforms it has been observed that the order in which the 1D sweeps are performed changes the final result. Consequently, in another embodiment, 2D masked wavelets are computed directly. However, lookup tables required for such direct 2D masked wavelet computation tend to be quite large. Consequently, to improve compression speed and reduce system overhead, the first embodiment, i.e., computation of the 2D wavelets using a succession of 1D wavelet transforms is used in a working embodiment of image compression using masked wavelet transforms.

In addition to the just described benefits, other advantages of the present invention will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
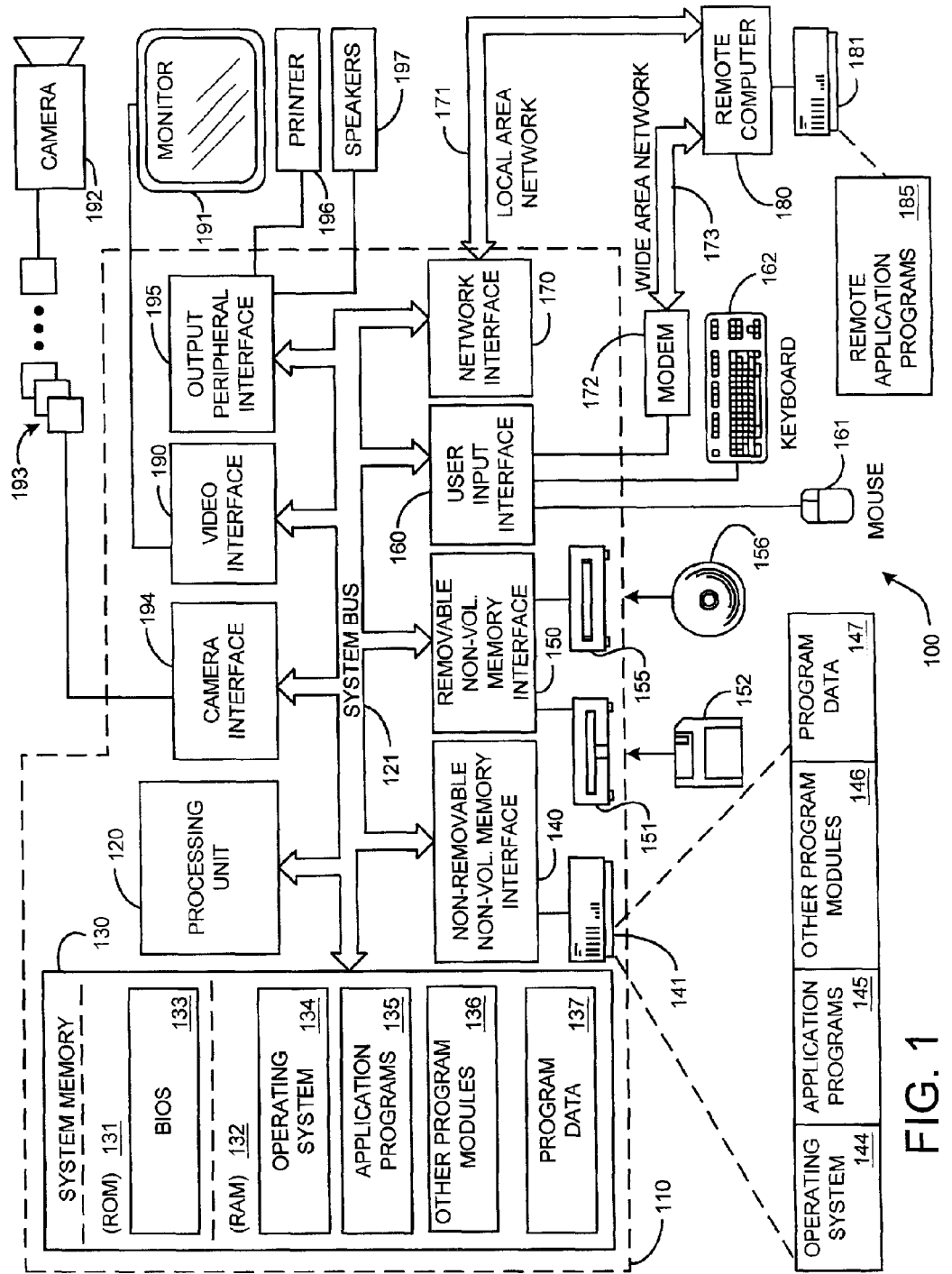
FIG. 1 is a general system diagram depicting a general-purpose computing device constituting an exemplary system for implementing the present invention.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, date structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the present invention.

2.0 Introduction:

A masked wavelet coding system and method as described herein is useful for encoding and decoding masked images. In general, compression of images that have masked or "don't care" regions which are delineated by a binary image mask is achieved using "masked wavelet transforms" which are a function of the mask. A unique mask-dependent lifting scheme is used to compute invertible wavelet transforms from the input image for use in encoding and decoding the input image. These mask-dependent wavelet transforms are derived from the input image based on the masked regions within the image. Masked wavelet coding automatically generates an appropriate linear combination of available, unmasked, neighboring pixels, for both the prediction and the update steps of lifting for each pixel. This pixel availability is then used to change the wavelet function on a case-by-case basis as a function of the mask by using a polynomial of degree k−1 for interpolation in both the predict and update steps of lifting where at least k unmasked neighboring pixel values are available.

2.1 System Overview:

In general, a system and method for image compression using masked coefficients locally adapts these coefficients as a function of the mask applied to the input image, and then uses a standard wavelet or linear transform. Consequently, unlike conventional schemes using lifting for computing wavelets, the masked wavelet coding described herein intentionally ignores masked or don't-care pixel values within the input image rather than first filling or estimating pixel values for such regions as do the conventional schemes.

Conventional lifting schemes are well known to those skilled in the art. Consequently, conventional lifting will be described only briefly before describing in detail the adaptations which allow lifting to be applied to irregular grids such as masked images. In general, "lifting" is an algorithm which is used to efficiently calculate wavelet transforms by factoring computation between a high pass filter (which yields the wavelet coefficients of the current band) and a low pass filter (which yields the coefficient used in the next lower resolution band). The wavelet transform of a signal, such as an image, is a multi-resolution representation of that signal where the wavelets are the basis functions which at each resolution level decorrelate the signal. In the conventional lifting scheme, a wavelet transform can be decomposed as a succession of prediction steps for a highpass filter and update steps for a lowpass filter, performed at each resolution level. Typically 4 to 6 lifting stages are used. Further, with traditional lifting, in computing a wavelet transform, each prediction step computes a linear function of a predetermined set of neighboring pixels to predict the current pixel. However, because traditional lifting requires a predetermined set of neighboring pixels to predict the current pixel, it is unsuitable for predicting pixels in irregular grids such as masked images having masked or don't-care regions in place of one or more pixels.

This limitation is successfully addressed by using masked wavelet coding as described herein. In particular, masked wavelet coding automatically generates an appropriate linear combination of available, unmasked, neighboring pixels, for both the prediction and the update steps, for each pixel for each stage of lifting. At each pixel location, the mask creates a pattern of availability, which must then be converted into the correct linear combination of the available pixel values. For example, assuming an unmasked image, using a traditional cubic wavelet to predict a neighboring pixel requires three known neighboring pixels. However, assuming that any of those neighboring pixels is masked, computing a traditional cubic wavelet via lifting will no longer work because the result would depend on missing values, e.g., on masked pixels. Setting the missing values to some constant (zero, match to neighbors, or some average over the whole image, etc.) can introduces sharp discontinuities, which translate into poor compression and/or undesirable artifacts.

Consequently, the masked wavelet approach described herein changes the wavelet function on a case-by-case basis as a function of the mask. In particular, during the prediction step of lifting, if k values are available for the prediction, a polynomial of degree k−1 is used for the interpolation. For example, where only three neighboring pixel values are available, a quadratic polynomial is used instead of a cubic polynomial. Similarly, if two neighboring pixel values are available, a linear polynomial is used instead of a quadratic or cubic polynomial. If only one value is available, a constant polynomial is used, and the wavelet becomes a conventional "Haar wavelet." Note that if the signal is a polynomial of degree k−1 and k neighboring pixels are not masked, the prediction is perfectly accurate.

In one embodiment, given the aforementioned method of determining an appropriate polynomial of degree k−1 for the prediction step, the coefficients for the polynomial can be predetermined and placed in a lookup table. For example, the coefficients of polynomial wavelets of various orders, i.e., constant, linear, quadratic, cubic, etc., are easy to compute knowing that the wavelet must go through certain pixel values at given positions (which are a function of the mask). Thus, these values are placed in a lookup table, and assigned to the polynomial for the prediction step depending upon how many unmasked pixels are available and at what positions for predicting the neighboring pixel. This embodiment allows for very fast computation of the masked wavelets.

Similarly, in the update step, one or more pixels of the input image are again masked. Consequently, the order of the polynomial available for update is again determined based on how many unmasked pixels are available for the update step. Again, a lookup table is used in one embodiment for assigning the coefficients to the polynomials used for the update step.

Once the masked wavelets have been computed using the lifting procedure described herein, the masked wavelet transforms are normalized so that quantization error on each of the wavelets coefficients introduces a comparable reconstruction error.

In coding of the inverse wavelet transform, it should be noted that the coefficient values to be used are the ones that invert the predict and the update steps that were made with a mask viewed from different locations. Thanks to the lifting formalism, one can easily invert the update step and then invert the predict step, at each stage, and recover the original image.

Finally, in the absence of a mask, with conventional lifting, a 2D wavelet transform is computed over the 2D image by a performing a succession of 1D wavelet transforms. This is possible because the 2D filter is separable and can be done using two 1D filters. However, a binary mask is not generally separable. Therefore, computation of the 2D masked wavelet using a succession of 1D masked wavelet transforms serves to provide a close, but not perfect, approximation of the 2D transform needed for the 2D image. However, it should be noted, that as described in greater detail below, alternate embodiments of the system and method for masked wavelet coding described herein use either 1D or 2D wavelet transforms.

Figure 2:
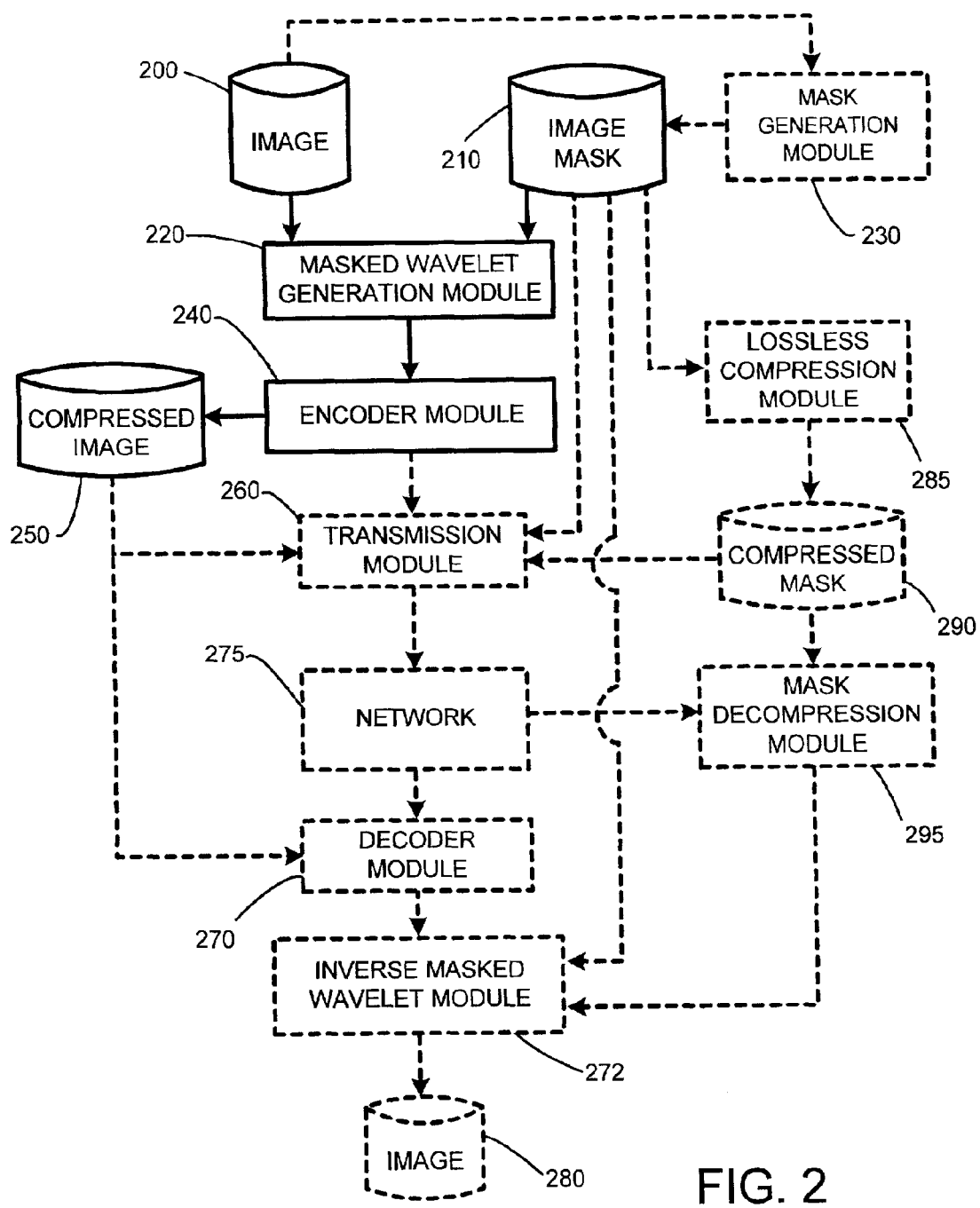
FIG. 2 illustrates an exemplary architectural diagram showing exemplary program modules for implementing the present invention.

2.2 System Architecture:

The process summarized above is illustrated by the general system diagram of FIG. 2. In particular, the system diagram of FIG. 2 illustrates the interrelationships between program modules for implementing a system and method for masked wavelet coding of masked images. It should be noted that the boxes and interconnections between boxes that are represented by broken or dashed lines in FIG. 2 represent alternate embodiments of the present invention, and that any or all of these alternate embodiments, as described below, may be used in combination with other alternate embodiments that are described throughout this document.

In general, as illustrated by FIG. 2, the masked wavelet coding system begins by providing an input image file 200 and a binary image mask 210 to a masked wavelet generation module 220. Note that in an alternate embodiment, as discussed in greater detail below, a mask generation module 230 is used to automatically generate the binary mask from the input image 200. Next, the masked wavelet generation module 220 generates a set of invertible masked wavelets using the mask-dependent lifting scheme discussed below in Section 3.0 which are in turn provided to an encoder module 240. The encoder module 240 then uses the invertible masked wavelets to generate a compressed version 250 of the input image 200. The compressed image 250 is then stored in a computer readable media for later use.

In one embodiment, the compressed image 250 is then provided to a decoder module 270, while the image mask 210 is provided to an inverse masked wavelet module 272. The decoder module 270 then decompresses the compressed image 250 and the inverse masked wavelet module 272 inverts the decoded wavelets and uses the mask 210 to regenerate the input image 200 as output image 280 by using the mask-dependent lifting scheme discussed below in Section 3.0.

In further alternate embodiments, the compressed image 250 and the image mask 210 are provided to a transmission module for transmission over a conventional network 275. Once transmitted over the network 275, the compressed image 250 and image mask 210 are either stored for later use, or provided to the decoder module 270 and the inverse masked wavelet module 272, respectively, for decoding and reconstructing the input image 200 to produce the output image 280 using the mask-dependent lifting scheme discussed below in Section 3.0.

In still another embodiment, the image mask 210 is compressed by a lossless compression module 285 using a conventional lossless compression scheme, such as, for example JBIG, or BLC (as described by H. S. Malvar, in "Fast Adaptive Encoder for Bi-Level Images," *IEEE Data Compression Conf.*, Snowbird, UT, March 2001). Such lossless compression schemes are well known to those skilled in the art. The lossless compression module 285 then provides a compressed mask 290 to either the transmission module 260 for transmission over the network 275 along with the compressed image 250. Once the compressed mask 290 has been transmitted over the network 275, it is decompressed using conventional techniques by a mask decompression module 295. As noted above, the uncompressed mask 210 and the compressed image 250 are then provided to the decoder module 270 and inverse masked wavelet module 272, respectively, for decoding and reconstructing the input image 200 to produce the output image 280 using the mask-dependent lifting scheme discussed below in Section 3.0.

In a related embodiment, the compressed mask 290 is stored locally on computer readable media without being transmitted over a network. In this embodiment, the compressed mask is provided directly to the mask decompression module 295, with the decompressed mask in turn provided directly to the inverse masked wavelet module, while the compressed image 250 is provided to the decoder module 270 for reconstructing the input image 200 to produce the output image 280 using the mask-dependent lifting scheme discussed below in Section 3.0.

3.0 System Operation:

A unique mask dependent lifting scheme is used to compute invertible mask-dependent wavelet transforms of the input image for use in encoding and decoding the input image. These mask-dependent wavelet transforms are derived from the input image based on the masked regions within the image. Masked wavelet coding automatically generates an appropriate linear combination of available, unmasked, neighboring pixels, for both the prediction and the update steps of "lifting" for each pixel. This pixel availability is then used to change the wavelet function on a case-by-case basis as a function of the mask by using a polynomial of degree k−1 for interpolation in both the predict and update steps of lifting where at least k unmasked neighboring pixel values are available.

3.1 Masked Wavelets:

As noted above, the masked wavelets described herein are locally adapted to the input image as a function of the binary mask. Given this adaptation, lifting is useful for computing the masked wavelets, because the inverse wavelet transform can easily be derived from the straight wavelet transform.

While many conventional schemes exist for adapting wavelet transforms while preserving perfect invertibility at all points, none of the conventional schemes adapt the transform based on signal characteristics, nor do they consider missing data.

According to the lifting scheme, the wavelet transform can be decomposed as a succession of prediction steps (for the highpass filter), and update steps (for the lowpass filter) performed at each resolution. In the traditional wavelet transform, each prediction step computes a linear function of a predetermined set of neighboring pixels to predict the current pixel. The same is true for the update step. However, in the case of a masked wavelet, certain pixels in the input image are masked, and thus have no suitable values for either the prediction or update steps. Consequently, a system and method for masked wavelet coding solves this problem by, for each pixel, generating an appropriate linear combination of the neighboring pixels that are available, for both the prediction and the update steps. At each pixel location, the mask creates a pattern of availability which is used in determining an appropriate linear combination of the available pixel values.

Figure 3:
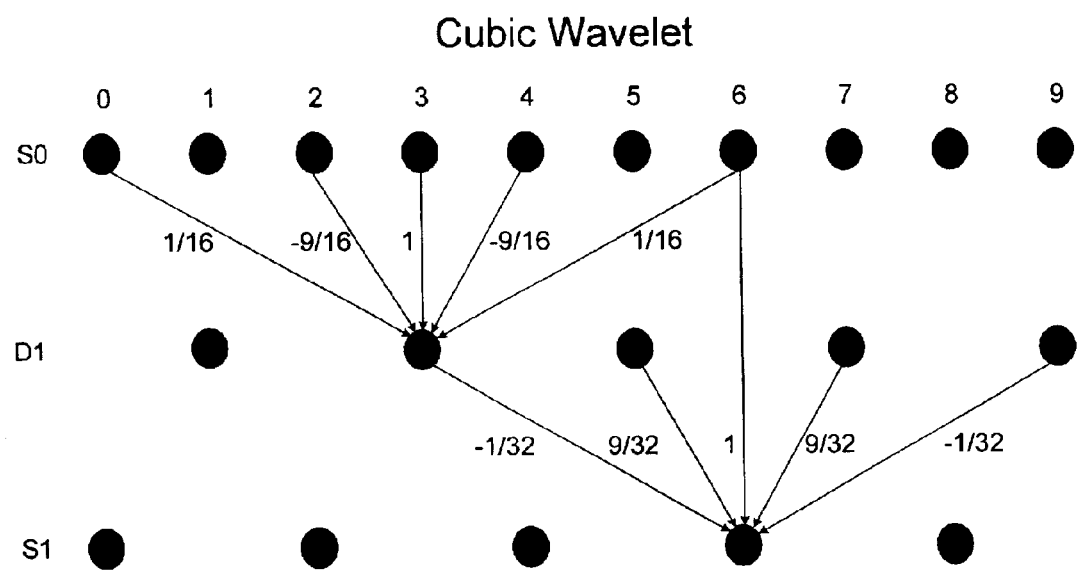
FIG. 3 illustrates an exemplary graphical representation of conventional lifting steps for a traditional cubic wavelet transform.
Figure 4:
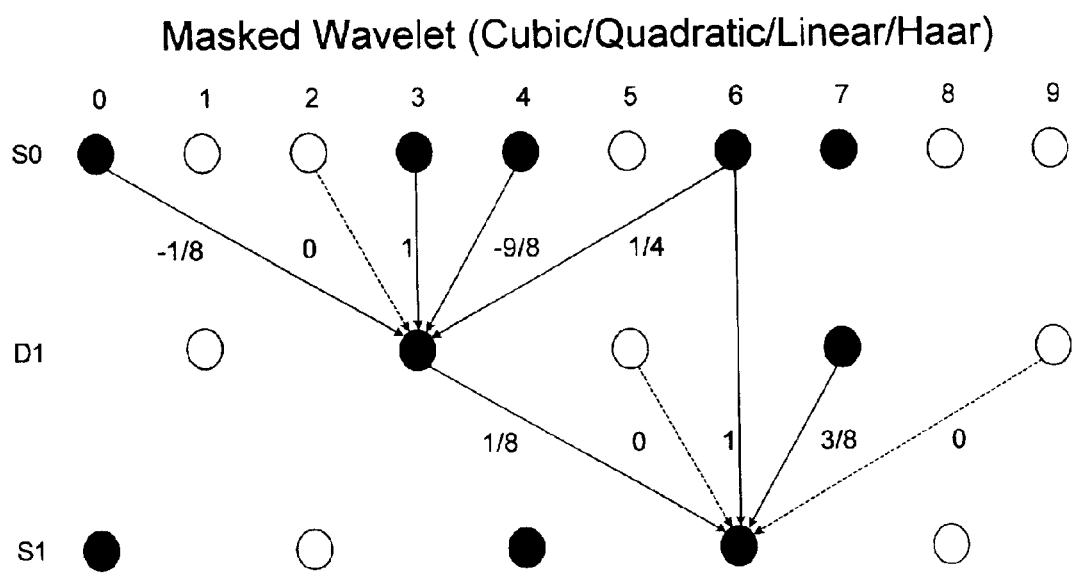
FIG. 4 illustrates an exemplary graphical representation of lifting steps adapted to masked wavelet transforms according to the present invention.

This concept is illustrated in FIG. 3 and FIG. 4. In particular, one step of the conventional computation of a cubic wavelet using "lifting" is illustrated by FIG. 3. FIG. 3 shows, for a cubic wavelet, the prediction step at position 3, and the corresponding update step at position 6. Note that all other pixel positions are omitted in FIG. 3 for purposes of clarity. The coefficient next to each arrow indicates how to compute the linear combination in order to perform each step. For instance, the "detail" value (resulting from the high pass filter) at position 3 is computed by computing the following equation: $d_3 = s_3 - (-s_0 + 9\,s_2 + 9s_4 - s_6)/16$, while the update step is computed using the following equation: $s_6 = d_6 + (-d_3 + 9d_5 + 9d_7 - d_9)/32$. Note that the computation can be done in place, i.e., in the same computer memory location, using conventional computation techniques for the purpose of improving computer computational performance.

FIG. 4 illustrates the problem solved by masked wavelet coding when some of the pixel values are missing. In particular, as illustrated by FIG. 4, no value is available for positions 1, 2, 5, 8, and 9. Consequently, computing the traditional cubic wavelet will not work because the result would depend on missing values. As noted above, setting the missing values to some constant (zero, or some average over the whole image) can introduces sharp discontinuities, which translate into poor compression and/or undesirable artifacts. Therefore, masked wavelet coding changes the wavelet function on a case-by-case basis as a function of the mask. For instance, during the prediction step of lifting, if k values are available for the prediction, a polynomial of degree k−1 is used for the interpolation. When only 3 values are available, a quadratic instead of cubic polynomial is used. If only one value was available, a constant polynomial is used, and the wavelet is a Haar wavelet. Note that if the signal is a polynomial of degree k−1 and k pixels are not masked, the prediction is perfectly accurate.

3.2 Computation of Masked Wavelets:

As noted above, lifting is comprised of a succession of pairs of prediction and update steps. The first prediction and update steps are done on the image. The result of the update step, i.e. the coefficients at the even positions, is then used as the input for the second pair of prediction and update steps, or the second stage, at half the resolution. The result of that update step of that stage is then used for the next stage at one quarter of the resolution, and so on. Typically 4 to 6 lifting stages are used in image compression. In the case of masked wavelets, the staging aspect is similar. Since the location of each coefficient is preserved, the masking information is carried through the multiple stages. This means that if a coefficient is masked and is at a position which is a high power of 2, it will remain at an even position for multiple stages, and it will be considered as masked for each of these stages. The prediction and update steps as adapted for the system and method of masked wavelet coding described herein are described below.

Figure 5:
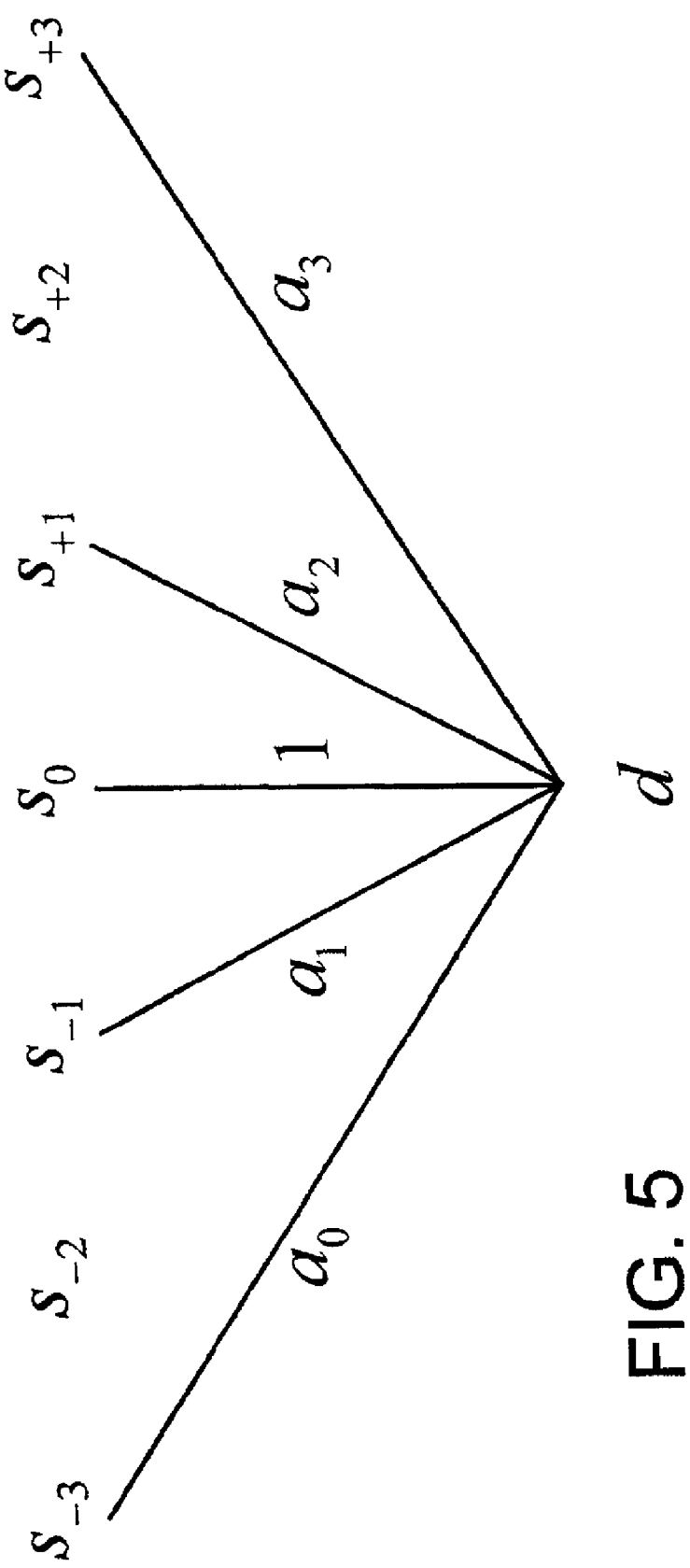
FIG. 5 illustrates a 7-tap filter used with a signal in the prediction step of lifting according to the present invention.

3.2.1 The Prediction Step for Computation of Masked Wavelets:

According to lifting, the prediction step computes a prediction for all the coefficients at odd positions from the coefficients at even positions. The difference between the odd coefficient and its prediction is the wavelet coefficient. This can be viewed as a highpass filter with some zeros at the odd positions. For purposes of explanation only, a 7-tap filter is used to describe the prediction step. It should be appreciated by those skilled in the art that a filter of any desired order may be used in a system and method for masked wavelet coding as described herein. As illustrated in FIG. 5, a 7-tap filter is used with a signal s, where $s_0$ is predicted as a function of $s_{-3}, s_{-1}, s_1, s_3$ and the residual d, i.e., the wavelet coefficient, is computed using lifting. For purposes of explanation, the signal s has been centered on position 3 and indexed accordingly. This notation serves to simplify the calculations described in the following sections with respect to "moments." Also as illustrated in FIG. 5, a filter a is indexed from 0 to 3 in accordance with standard matrix notation. The wavelet coefficient d is given by Equation 1:

$$d = s_0 + \sum_{i=0}^{i=|k/2|} s_{2i-k/2} a_i \qquad \text{Equation 1}$$

where k is the number of taps in the filter (in this case k=7). As illustrated by Equation 2, after setting $s_i = i^n$, the moments of the high pass filter can be written as:

$$M_n = 0^n + \sum_{i=0}^{i=|k/2|} (2i - k/2)^n a_i \qquad \text{Equation 2}$$

The assumption is then made that a regular signal, i.e., the input image, can be approximated by a low order polynomial (using Taylor expansion) of order j. Consequently, choosing a so as to set the first j+1 moment to zero, the wavelet transform will have many zeros and compress very well. Since in this example, a has 4 degrees of freedom, the first 4 moments can be set to zero. This results in the following system, as illustrated by Equation 3:

$$\begin{bmatrix} 1 & 1 & 1 & 1 \\ -3 & -1 & 1 & 3 \\ 9 & 1 & 1 & 9 \\ -27 & -1 & 1 & 27 \end{bmatrix} \begin{bmatrix} a_0 \\ a_1 \\ a_2 \\ a_3 \end{bmatrix} = \begin{bmatrix} -1 \\ 0 \\ 0 \\ 0 \end{bmatrix} \qquad \text{Equation 3}$$

which can be rewritten in matrix notation as: wa=c. The solutions to this system are the coefficients used in the well known cubic wavelet $a = [1/16, -9/16, -9/16, 1/16]$.

Given this introductory explanation, the example can now be generalized to the case where a binary mask is present. In other words, when the mask is present, some of the coefficients $S_{2i-k/2}$ are missing. This can be modeled by introducing a matrix, m, as illustrated by Equation 4:

$$m = \begin{bmatrix} m_0 & 0 & 0 & 0 \\ 0 & m_1 & 0 & 0 \\ 0 & 0 & m_2 & 0 \\ 0 & 0 & 0 & m_3 \end{bmatrix} \quad \text{Equation 4}$$

where $m_i \in \{0,1\}$, such that: wma=c. Note that $m_i=0$ corresponds to a masked pixel, while $m_i=1$ corresponds to a non-masked pixel in the input image. The effect of m is to remove the column in the system of Equation 3. Unfortunately, in this system, $a_i$ is under-determined when $m_i=0$, and over-determined otherwise. The reason is that there are too many vanishing moments constraints imposed on the $a_i$ corresponding to visible pixels This can be easily fixed by imposing the condition that only the first j moments should be 0, if there are j coefficients such that $m_i \neq 0$. This corresponds to keeping only the first j equations of the system of Equation 3. For the under-determined coefficients $a_i$ (when $a_i$ is multiplied by $m_i=0$), arbitrary constraint $a_i=0$ is added. All this can be done in one system as illustrated by Equation 5:

$$(pwm+m-I)a=pc \quad \text{Equation 5}$$

where I is the identity matrix, and:

$$p = \begin{bmatrix} p_0 & 0 & 0 & 0 \\ 0 & p_1 & 0 & 0 \\ 0 & 0 & p_2 & 0 \\ 0 & 0 & 0 & p_3 \end{bmatrix} \quad \text{Equation 6}$$

with $$p_i = \begin{cases} 1 & \text{if } m > i \\ 0 & \text{if } m \leq i \end{cases} \quad \text{Equation 7}$$

The constraints on $p_i$ ensure the lines in the system of Equation 3 are removed from the bottom for each 0 coefficient in m. In other words, if there are j coefficients $m_i$ which are not equal to 0, then $p_i=1$ for $i=[0 \ldots j-1]$, and $p_i=0$ otherwise. It can easily be verified that the system always has a unique solution for every value of $m_i \in \{0,1\}$. The solutions for a for all possible values of m, assuming a 7-tap filter as noted above, are given by the system of Equation 5, and summarized for the cubic wavelet in Table 1. In particular, Table 1 provides solutions of Equation 5 for different values of m when the dimension of the system is 4. Again, note that m simply indicates whether a pixel is masked or visible.

TABLE 1

Solutions to Equation 5
for values of m when system dimension is 4.

| $(m_0, m_1, m_2, m_3)$ | $a_0$ | $a_1$ | $a_2$ | $a_3$ |
|---|---|---|---|---|
| 0000 | 0 | 0 | 0 | 0 |
| 0001 | 0 | 0 | 0 | -1 |
| 0010 | 0 | 0 | -1 | 0 |
| 0011 | 0 | 0 | -3/2 | 1/2 |
| 0100 | 0 | -1 | 0 | 0 |
| 0101 | 0 | -3/4 | 0 | -1/4 |
| 0110 | 0 | -1/2 | -1/2 | 0 |
| 0111 | 0 | -3/8 | -3/4 | 1/8 |
| 1000 | -1 | 0 | 0 | 0 |

TABLE 1-continued

Solutions to Equation 5
for values of m when system dimension is 4.

| $(m_0, m_1, m_2, m_3)$ | $a_0$ | $a_1$ | $a_2$ | $a_3$ |
|---|---|---|---|---|
| 1001 | -1/2 | 0 | 0 | -1/2 |
| 1010 | -1/4 | 0 | -3/4 | 0 |
| 1011 | -1/8 | 0 | -9/8 | 1/4 |
| 1100 | 1/2 | -3/2 | 0 | 0 |
| 1101 | 1/4 | -9/8 | 0 | -1/8 |
| 1110 | 1/8 | -3/4 | -3/8 | 0 |
| 1111 | 1/16 | -9/16 | -9/16 | 1/16 |

Figure 6:
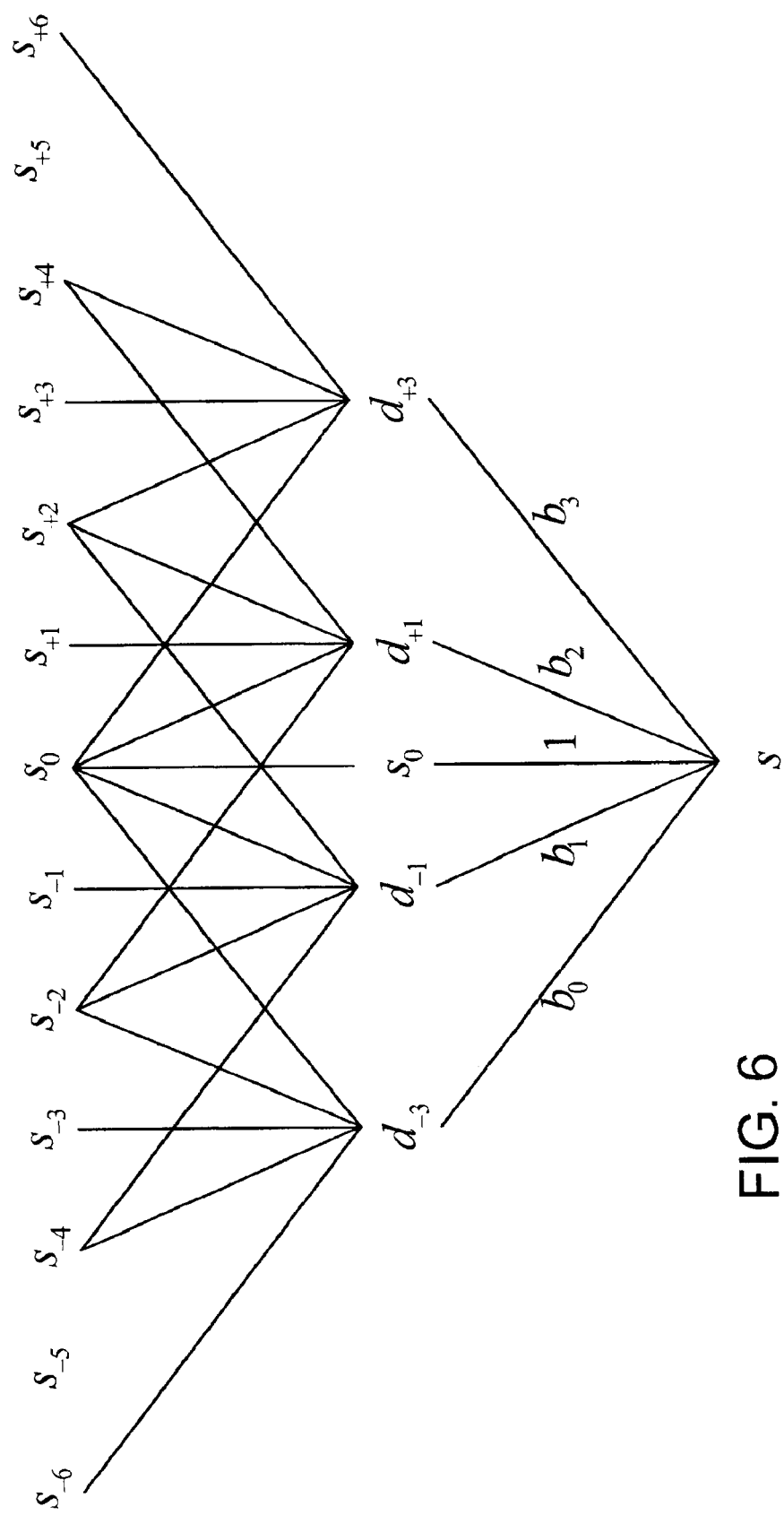
FIG. 6 illustrates a 7-tap filter used with a signal in the update step of lifting according to the present invention.

3.2.2 The Update Step for Computation of Masked Wavelets:

In the prediction step, the idea is to make the first moments of the high pass filter vanish. Similarly, in the update step, the idea is to make the first moments of the low pass filter vanish, after the signal has been multiplied by $(-1)^i$. In other words, if a regular signal, i.e., a signal that can be written as a low order polynomial, is multiplied by the highest frequency signal, $(-1)^i$, the low pass filter should output zero. This condition can easily be cast as a 0-moment constraint, as described in the previous section, except that the input will be of the form $s_i=(-1)^i i^n$ rather than $s_i=i^n$. Using similar notation to that provided for the predict step, the update step is shown in FIG. 6, which corresponds to Equation 8 as follows:

$$s = s_0 + \sum_{i=0}^{i=|k/2|} d_{2i-k/2} b_i \quad \text{Equation 8}$$

where k is the number of taps in the filter (in this case k=7). Note that as illustrated by FIG. 6, the update step s is updated as a function of $d_{-3}, d_{-1}, d_1, d_3$.

The moments of the low pass filter can be written as illustrated by Equation 9 as follows:

$$M_n = 0^n + \sum_{i=0}^{i=|k/2|} d_{2i-k/2} b_i \quad \text{Equation 9}$$

Further, assuming $s_i=(-1)^i i^n$, Equation 9 can be rewritten locally for each $d_i$ as illustrated in Equation 10:

$$d_j = s_j + \sum_{i=0}^{i=|k/2|} s_{j+2i-k/2} a_i$$

$$= -j^n + \sum_{i=0}^{i=|k/2|} (j+2i-k/2)^n a_i \quad \text{Equation 10}$$

since j and k/2 are odd. In addition, Equation 11 is provided to illustrate that individual $a_i$ are set to generate zero moments, as follows:

$$0 = j^n + \sum_{i=0}^{i=|k/2|} (j+2i-k/2)^n a_i \quad \text{Equation 11}$$

which implies $d_j=-2j^n$. Therefore the moments can be calculated by Equation 12, as follows:

$$M_n = 0^n + \sum_{i=0}^{i=\lfloor k/2 \rfloor} -2(2i-k/2)^n b_i \quad \text{Equation 12}$$

For the wavelet to efficiently compress a regular signal, it is necessary to have as many moments equal to zero as possible. Since the 7-tap filter example described above includes 4 degrees of freedom, the first 4 moments can be set to zero. Setting these moments to zero results in the following system, as illustrated by Equation 13:

$$\begin{bmatrix} 1 & 1 & 1 & 1 \\ -3 & -1 & 1 & 3 \\ 9 & 1 & 1 & 9 \\ -27 & -1 & 1 & 27 \end{bmatrix} \begin{bmatrix} b_0 \\ b_1 \\ b_2 \\ b_3 \end{bmatrix} = \begin{bmatrix} 1/2 \\ 0 \\ 0 \\ 0 \end{bmatrix} \quad \text{Equation 13}$$

Equation 13 can be rewritten in matrix notation as wb=C'. The solutions to this system are the coefficients used in the well known cubic wavelet:

b=[1/32, 9/32, 9/32, −1/32].

Now the procedure for the update step, assuming that some of the coefficients, $s_i$ are missing, will be described. First, for purposes of explanation, assume that all missing values are only at even locations. Given this assumption, the system illustrated by Equation 13 can be solved in a fashion similar to that for solving Equation 3. In particular, the solution to Equation 13 verifies that, as illustrated by Equation 14:

$$(pwm+m-I)b=pc' \quad \text{Equation 14}$$

Note that the m and p matrices depend on the location centered in $s_0$. In particular, each location centered in $s_0$ views a different part of the mask and thus has its own m and p matrices. Solutions to Equation 14 for different values of m when the dimension of the system is 4 are provided in Table 2. Note that in deriving Equation 14, it was assumed that all the odd locations were not masked, i.e., only even locations were masked. However, if some odd locations are also are masked, but the number of masked value is less than n, then $d_j=-2j^n$, and Equation 14 remains valid. Otherwise, there are two many masked pixels in the predict step to nullify the n-th moment in the update step (the wavelet coefficient will still be as small, but not zero).

TABLE 2

Solutions to Equation 14 for values of m when system dimension is 4.

| $(m_0, m_1, m_2, m_3)$ | $b_0$ | $b_1$ | $b_2$ | $b_3$ |
|---|---|---|---|---|
| 0000 | 0 | 0 | 0 | 0 |
| 0001 | 0 | 0 | 0 | 1/2 |
| 0010 | 0 | 0 | 1/2 | 0 |
| 0011 | 0 | 0 | 3/4 | −1/4 |
| 0100 | 0 | 1/2 | 0 | 0 |
| 0101 | 0 | 3/8 | 0 | 1/8 |
| 0110 | 0 | 1/4 | 1/4 | 0 |
| 0111 | 0 | 3/16 | 3/8 | −1/16 |
| 1000 | 1/2 | 0 | 0 | 0 |
| 1001 | 1/4 | 0 | 0 | 1/4 |
| 1010 | 1/8 | 0 | 3/8 | 0 |
| 1011 | 1/16 | 0 | 9/16 | −1/8 |
| 1100 | −1/4 | 3/4 | 0 | 0 |
| 1101 | −1/8 | 9/16 | 0 | 1/16 |
| 1110 | −1/16 | 3/8 | 3/16 | 0 |
| 1111 | −1/32 | 9/32 | 9/32 | −1/32 |

3.2.3 Computation of 1D vs. 2D Masked Wavelet Transforms:

In the absence of a mask, with conventional lifting, a 2D wavelet transform is computed over the 2D image by a performing a succession of 1D wavelet transforms. This is possible because the 2D filter is separable and can be done using two 1D filters. However, a binary mask is not generally separable. Therefore, computation of the 2D masked wavelet using a succession of 1D masked wavelet transforms serves to provide a close, but not perfect, approximation of the 2D transform needed for the 2D image. In tested embodiments, using the system and method described above, the 2D masked wavelet is computed using a succession of 1D masked wavelet transforms. However, it has been observed that the order in which the 1D sweeps are performed changes the final result to a small extent. Again, it should be noted that the computation of the 2D transform using a succession of 1D transforms provides a close approximation of the 2D transform.

Therefore, to improve accuracy of the 2D masked wavelets, in an alternate embodiment, the 2D masked wavelets are computed directly. The main difference between 1D and 2D resides in the fact that neighboring pixels in the 2D space are considered, instead of 1D. To apply lifting, the choice of neighboring pixels can be the pixel such that the sum of the abscissas and ordinates is even (for the predict step), and the pixel such that the sum of the abscissas and ordinates is odd (for the update step). Such choice is know in the literature as Quincunx disposition. The set of neighboring pixels for making prediction can also be different (i.e. various combination of even and odd pixels in either the abscissas or ordinates), as long as a lifting algorithm is used. As in the 1D case, the coefficients of the polynomials are evaluated by setting vanishing moments, except that in the 2D case, the vanishing moment in both the X and Y direction is needed. So if, for instance, four vanishing moments in both the X and Y direction are considered, all the moments combination would generate 16 equations. The 2D moments are defined by Equation 15, as follows:

$$M_{m,n} = 0^{mn} + \sum_{i=0}^{i=\lfloor k/2 \rfloor} \sum_{j=0}^{j=\lfloor k/2 \rfloor} (2i-k/2)^n (2j-k/2)^m a_{ij} \quad \text{Equation 15}$$

Note that in the absence of mask, four vanishing moments in both the X and Y direction would guarantee that all sixteen 2D moments also vanish. This is not the case in the presence of a mask because irregularities in the mask prevent the wavelet from being separable. Unfortunately, when looking at sixteen coefficients which can all be masked, a table with 2^16=65536 lines, and 16 columns, for a total of 1,048,576 elements must be pre-computed just for the predict step.

Consequently, to improve compression speed and reduce system overhead, the first embodiment, i.e., computation of the 2D wavelets using a succession of 1D wavelet transforms is used in a working embodiment of image compression using masked wavelet transforms.

3.3 Computation of Inverse Masked Wavelet Transforms:

The inverse masked wavelet transform is easily computed by undoing each lifting step locally. This is accomplished by using the lifting formalism in combination with the image mask for identifying the masked pixels. In other words, because each of the lifting steps is invertible, the inverse masked wavelet can be easily obtained from the forward transform, i.e., the masked wavelet transform. In general, in computing the inverse masked wavelet, the order of operations for computing the masked wavelet transform are reversed, the signs in the lifting steps are reversed, and the splitting step, i.e., separate highpass and lowpass filters of the input signal, is replaced by a merging step.

Specifically, in coding of the inverse wavelet transform, it should be noted that the coefficient values to be used are the ones that invert the predict and the update steps that were made with a mask viewed from different locations. Note that the filter coefficients used in both the forward and inverse transforms can be stored in either 1 or 2 tables, as the coefficients differ only by a factor $-\frac{1}{2}$.

Figure 7:
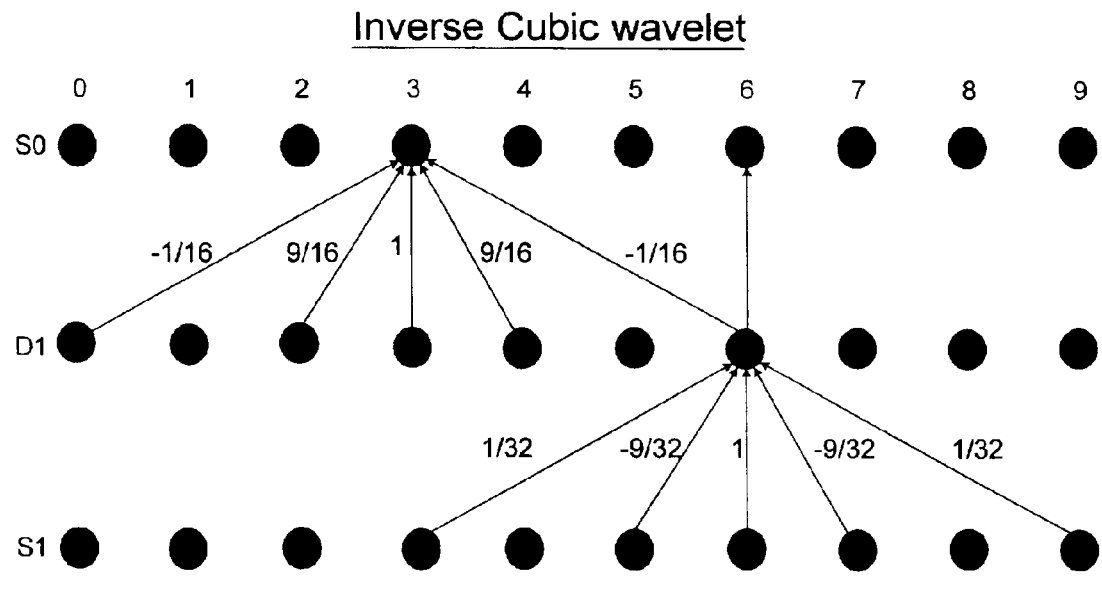
FIG. 7 illustrates an exemplary graphical representation of conventional lifting steps for a traditional inverse cubic wavelet transform.
Figure 8:
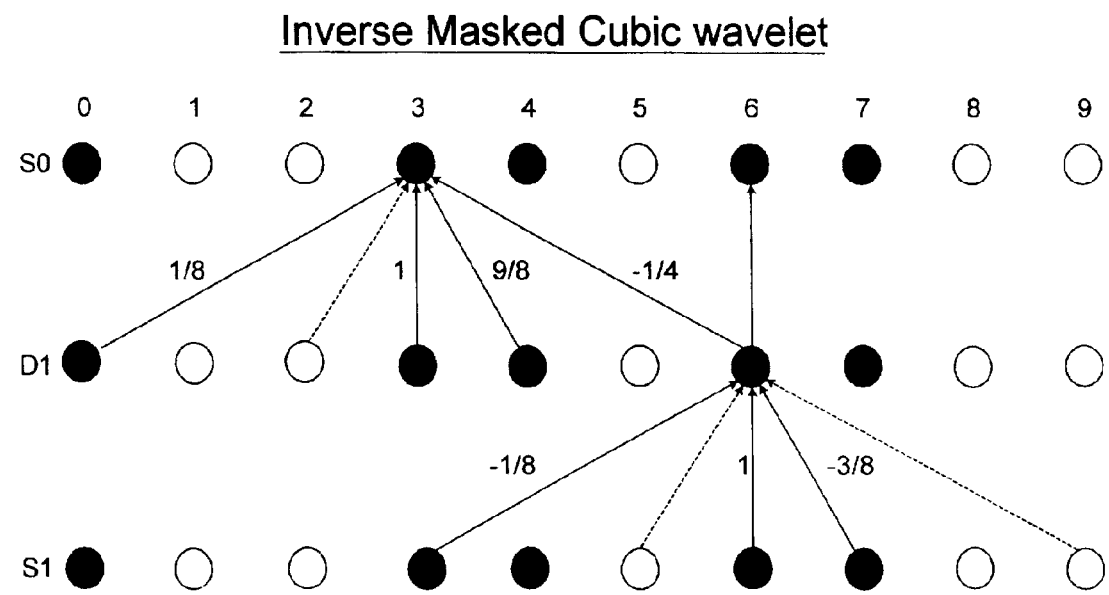
FIG. 8 illustrates an exemplary graphical representation of lifting steps adapted to inverse masked wavelet transforms according to the present invention.

These concepts are illustrated in FIG. 7 and FIG. 8, which illustrate computation of the inverse wavelet transforms computed as illustrated by FIG. 3 and FIG. 4, respectively. In particular, one step of the conventional computation of an inverse cubic wavelet using "lifting" is illustrated by FIG. 7. FIG. 7 shows, for the cubic wavelet computed as illustrated by FIG. 3, the reverse prediction step at position 3, and the corresponding reverse update step at position 6. The coefficient next to each arrow again indicates how to compute the linear combination in order to perform each step. Note that as with computation of the wavelet transform, the inverse wavelet transform can also be done in place, i.e., in the same computer memory location, using conventional computation techniques for the purpose of improving computer computational performance (a well known trait of lifting).

FIG. 8 illustrates the problem solved by masked wavelet coding when some of the pixel values are missing. In particular, FIG. 8 illustrates computation of the inverse masked wavelet for the masked wavelet transform computed as illustrated by FIG. 4. Again, no pixel value is available for positions 1, 2, 5, 8, and 9. Consequently, computing the traditional inverse cubic wavelet will not work because the result would depend on missing values. Specifically, masked wavelet coding changes the inverse wavelet function on a case-by-case basis as a function of the mask, thereby reversing the lifting steps used to compute the masked wavelet transform of FIG. 4. For instance, during the reverse prediction step of lifting, if k values are available for the reverse prediction, a polynomial of degree k−1 is used for the interpolation. Clearly, given the same image mask, the polynomial used for computation of the inverse masked wavelet transform will be of the same degree used to compute the masked wavelet transform.

3.4 Normalization of Masked Wavelet Transforms:

Once the masked wavelets have been computed, the masked wavelet transforms are normalized so that quantization error on each of the wavelets coefficients introduces a comparable reconstruction error. However, unlike conventional wavelet transforms, with masked wavelets, normalization for each coefficient is a complex function of the mask. In one embodiment, optimal normalization for masked wavelet coefficients is computed and used for image compression. However, the observed gain in compression performance for such optimized normalization is on the order of 0.5%. Consequently, in a working example of the masked wavelet transform, it was found that acceptable compression performance is achieved using a normalization that would be optimal if there was no mask. One advantage to using the normalization that would be optimal without a mask is that since it does not depend on the mask, the normalization coefficients can be pre-computed.

3.5 Implementation:

The program modules described in Section 2.0 with reference to FIG. 2 are employed in the masked wavelet coding system described above for automatically generating masked wavelets useful for encoding an input image file. This process is depicted in the flow diagram of FIG. 9. It should be noted that the boxes and interconnections between boxes that are represented by broken or dashed lines in FIG. 9 represent alternate embodiments of the present invention, and that any or all of these alternate embodiments, as described below, may be used in combination with other alternate embodiments that are described through this document.

Figure 9:
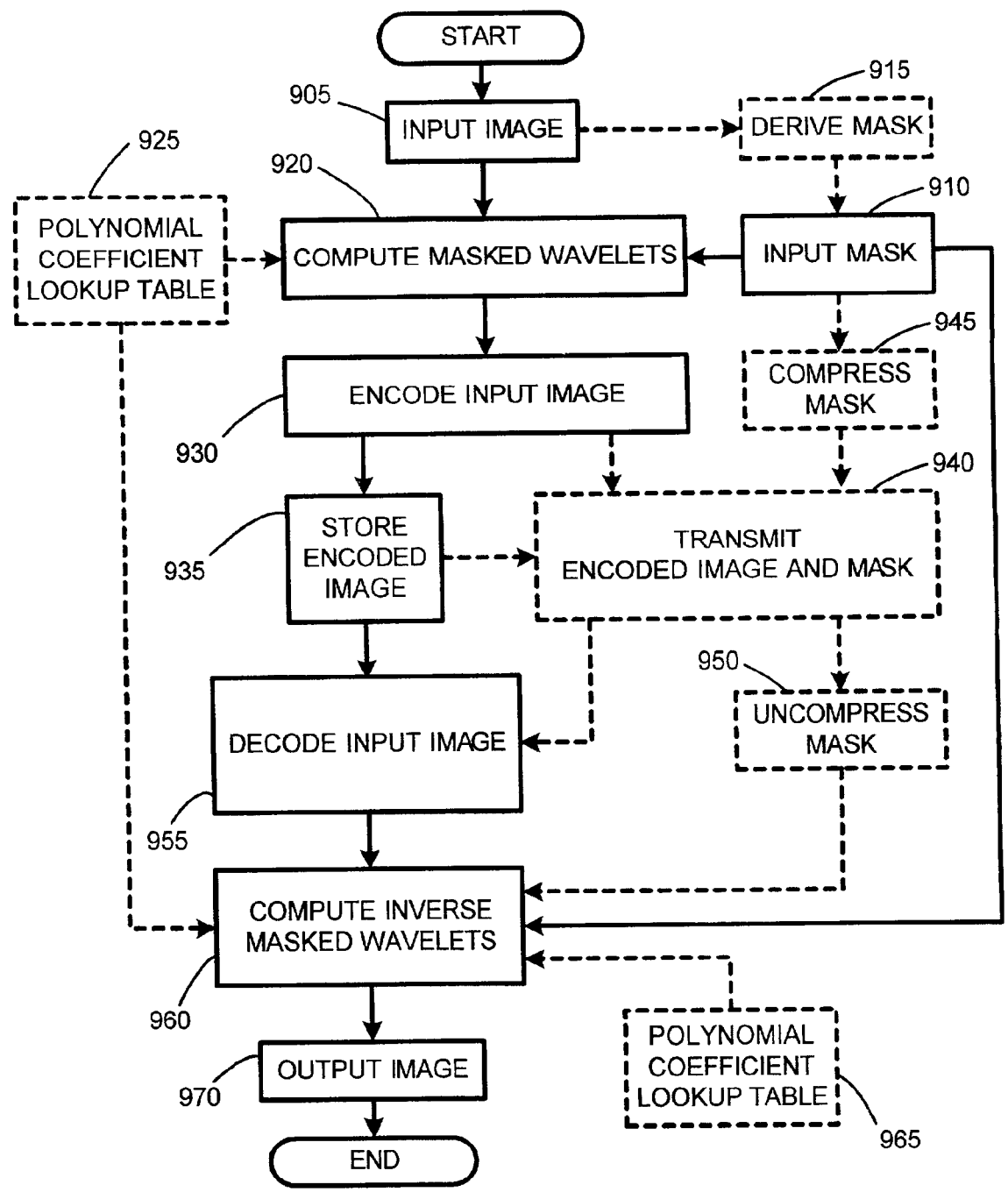
FIG. 9 illustrates an exemplary system flow diagram for coding images using masked wavelet transforms according to the present invention.

FIG. 9 illustrates an exemplary system flow diagram for encoding and decoding images using masked wavelet transforms. Referring now to FIG. 9 in combination with FIG. 2, the process is started by first inputting an image 905 and an image mask 910. As noted above, in one embodiment, the image mask is automatically derived 915 or separated from the image using any of a number of conventional techniques, including, for example, foreground/background subtraction, and mixed raster content (MRC). Either way, once both the input image 905 and the mask 910 have been input into the system, a set of masked wavelets representing the image are automatically computed 920 using the mask dependent lifting procedure described above.

As described above, the degree of the polynomial used to compute the wavelet for each pixel in the input image is based on the number of available, unmasked, pixels neighboring the pixel for which the wavelet is being computed. Also as noted above, the coefficients for the polynomials of a given degree are well known, and can be stored in a lookup table 925 for allowing rapid, in-place computation 920 of the masked wavelets using the mask dependent lifting procedure described above.

Once the masked wavelets have been computed 920, an encoder encodes the input image 930 using the masked wavelets. The encoded image can then be stored for later use 935, or transmitted via a conventional network 940 to a remote client computer. Note that in order to compute the inverse masked wavelets for decoding the encoded image, the image mask must also be provided along with the encoded image. As noted above, the image mask is either provided in an uncompressed format, or, in one embodiment, it is first compressed 945 using lossless compression. If compressed 945, the mask is first decompressed 950 before being provided to the remote client along with decoded wavelet coefficients provided by a decoder 955 for computing inverse masked wavelets 960 which are then used to reconstruct the original input image 910.

As described above, the degree of the polynomial used to compute the inverse wavelet for each pixel in the input image is based on the number of available, unmasked, pixels neighboring the pixel for which the inverse masked wavelet is being computed. Also as noted above, the coefficients for the polynomials are directly related (by a factor of $-\frac{1}{2}$) to the polynomials used for computation of the masked wavelets. Consequently, the same lookup table 925 can be used to provide the polynomial coefficients for computing the inverse masked wavelets. Alternately, in another embodiment, the polynomial coefficients for the inverse masked wavelets are stored in a second a lookup table 965 for allowing rapid, in-place computation 960 of the inverse masked wavelets using the mask dependent lifting procedures described above. Finally, the inverse masked wavelets are used to reconstruct the input image 905 to provide the output image 970 for display or storage, as desired.

4.0 Working Example:

In a working example of the present invention, the program modules described in Section 2.2 with reference to FIG. 2 in view of the detailed description provided in Section 3 we-e employed to encode and decode a set of images. Details of a set of experiments for determining the effectiveness of image compression at a range of peak signal-to-noise ratios (PSNR) using masked wavelets are provided in the following section. These details illustrate the advantages of the masked wavelet coding system described herein.

4.1 Results:

To evaluate the performance of masked wavelet coding as described above, it was compared with the performance of conventional Progressive Wavelet Codec (PWC) encoding of a masked image, using a projection onto convex set (POCS) to fill in the pixels under the mask. The POCS module was set to stop after 10 iterations, which makes encoding computationally intense (because 10 direct and inverse wavelet transform steps are required), whereas the masked wavelet coder has a speed comparable to that of PWC alone. Both codecs were then used to encode a set of artificially generated composite images, by applying a pre-defined mask to a cut-out of size 256×256 pixels of the popular "Lena" image.

Figure 10C:
FIGS. 10A through 10F illustrate the results of a working example of masked wavelet image coding, showing a comparison between conventional image coding techniques and masked wavelet coding according to the present invention.
Figure 10F:
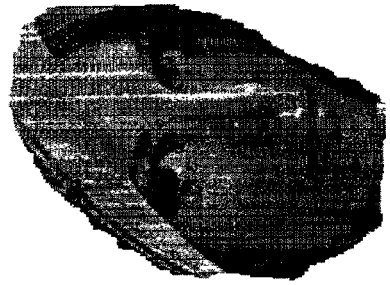
Figure 10B:
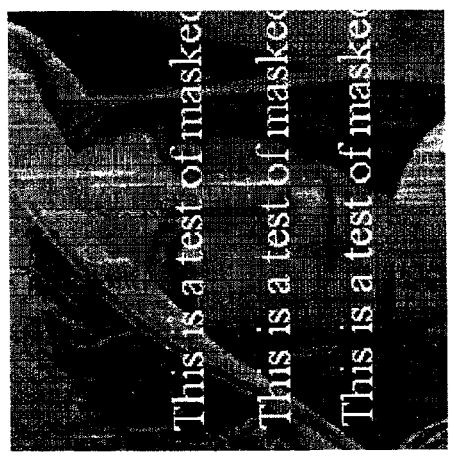
Figure 10E:
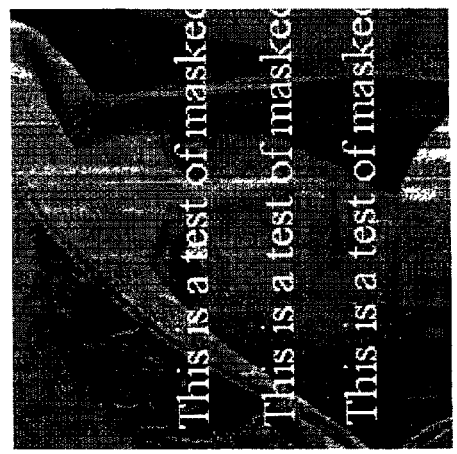
Figure 10A:
Figure 10D:
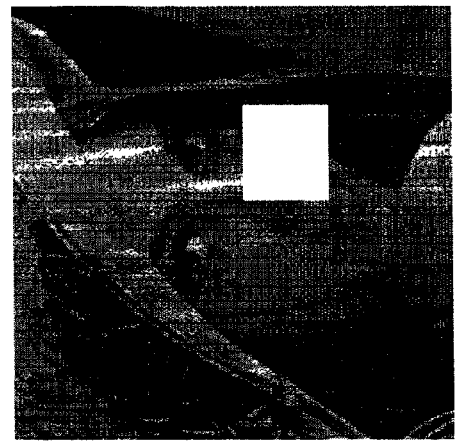

FIGS. 10A through 10F provide an example of reconstructed images using both the PWC/POCS coder and a coder using the masked wavelets described above. In particular, FIGS. 10A through 10C illustrate the coding result produced by the PWC/POCS coder at a PSNR of 40 dB. FIG. 10D through FIG. 10F illustrate the coding result produced by the masked wavelet coder described above, also at a PSNR of 40 dB. As can be seen from the two sets of images, given the same PSNR under the mask, both encoders produce images of similar subjective quality, and essentially free from ringing artefacts near the mask boundaries. However, the masked wavelet coder is an order of magnitude faster than PWC/POCS coder.

Table 3 shows the distortion-rate performance of both codecs. The performance improvement with the masked wavelet coder is naturally more significant for masks with a higher percentage of don't care pixels. It should be noted that at higher bit rates, the performance gap is higher, which can be attributed to the fact that the PWC/POCS coder has to spend more bits to encode the filled pixel areas generated by POCS (which are not quantized to zero at high rates). For example, given the mask of FIG. 10C and FIG. 10F, i.e., the white area surrounding the cut-out of the face, the reduction in file size with the masked wavelet coder is as high as about 18% in comparison to the PWC/POCS coder. Also, it should be noted that the PWC/POCS coder is computationally an order of magnitude more expensive during encoding. Also, PWC/POCS has a performance that is comparable to composite image coders such as the conventional DjVu codec. Consequently, the aforementioned experimentation illustrates that the masked wavelet coder described above improves on the conventional composite image coders by similar margins.

TABLE 3

Performance of Coders for the Masked Images Shown in FIG. 10A through FIG. 10F

| | Mask # 1 | | | Mask # 2 | | | Mask # 3 | | |
|---|---|---|---|---|---|---|---|---|---|
| | File length, bytes | | | File length, bytes | | | File length, bytes | | |
| PSNR | PWC POCS | Masked Wavelet | Gain % | PWC POCS | Masked Wavelet | Gain % | PWC POCS | Masked Wavelet | Gain % |
| 38 | 8,576 | 8,772 | −2.3% | 8,847 | 9,087 | −2.7% | 3,513 | 3,009 | 14.3% |
| 40 | 11,617 | 11,835 | −1.9% | 11,928 | 12,152 | −1.9% | 4,915 | 4,193 | 14.7% |
| 42 | 14,950 | 15,126 | −1.2% | 15,350 | 15,426 | −0.5% | 6,560 | 5,634 | 14.1% |
| 44 | 18,250 | 18,329 | −0.4% | 18,706 | 18,651 | 0.3% | 8,231 | 6,970 | 15.3% |
| 46 | 21,579 | 21,456 | 0.6% | 22,103 | 21,791 | 1.4% | 9,902 | 8,409 | 15.1% |
| 48 | 24,784 | 24,423 | 1.5% | 25,421 | 24,683 | 2.9% | 11,441 | 9,688 | 15.3% |
| 50 | 27,987 | 27,285 | 2.5% | 28,666 | 27,543 | 3.9% | 12,989 | 10,860 | 16.4% |
| 52 | 31,217 | 29,967 | 4.0% | 32,039 | 30,174 | 5.8% | 14,579 | 12,071 | 17.2% |
| 54 | 34,290 | 32,694 | 4.7% | 35,154 | 32,853 | 6.5% | 16,111 | 13,220 | 17.9% |

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for computing invertible wavelet transforms of a masked image comprising:
    applying a binary mask to an input image;
    determining which pixels in the input image are unmasked;
    automatically determining a linear combination of neighboring unmasked pixels for each unmasked image pixel;
    for each of the unmasked pixels in the input image, using the linear combination of neighboring unmasked pixels to automatically determine at least one polynomial sufficient to compute an invertible wavelet transform using a lifting algorithm having at least one lifting stage; and
    using the polynomials for each unmasked pixel to compute an invertible wavelet transform for each unmasked pixel by using the lifting algorithm.

2. The system of claim 1 wherein at least one two-dimensional invertible wavelet transform is computed over the input image by computing a succession of one-dimensional invertible wavelet transforms over the image.

3. The system of claim 1 wherein the invertible wavelet transforms are used to encode the input image.

4. The system of claim 3 wherein the invertible wavelet transforms are inverted to generate inverse wavelet transforms, and wherein the inverse wavelet transforms are used to decode the encoded input image.

5. The system of claim 1 wherein the invertible wavelet transforms are inverted to generate inverse wavelet transforms.

6. The system of claim 5 wherein generating inverse wavelet transforms requires using the binary mask to determine the polynomial for each invertible wavelet transform.

7. The system of claim 1 wherein the automatically determined polynomial degree is any of constant, linear, quadratic, and cubic.

8. The system of claim 7 wherein polynomial coefficients for each possible polynomial degree are stored in a lookup table.

9. A method for encoding a masked image comprising using a computer to:
apply a binary mask to an input image;
automatically compute a mask-dependent wavelet using a lifting algorithm having at least one stage for each unmasked pixel in the input image, wherein the mask-dependent wavelet computed for each pixel is computed using a polynomial having a degree dependent on a number of available unmasked neighboring pixels for each unmasked pixel in the input image for each stage of the lifting algorithm; and
automatically encode the input image using the mask-dependent wavelets.

10. The method of claim 9 wherein the encoded input image and the binary image mask are transmitted over a network to a remote client computer.

11. The method of claim 10 wherein the remote client computer automatically computes inverse mask-dependent wavelets with the lifting algorithm using the encoded image and the binary image mask.

12. The method of claim 11 wherein the inverse mask-dependent wavelets are used to decode the encoded input image.

13. The method of claim 11 wherein the binary mask is losslessy compressed prior to transmission over the network, and wherein the remote client computer uncompresses the binary mask for computing the inverse mask-dependent wavelets with the lifting algorithm using the encoded image and the binary image mask.

14. The method of claim 11 wherein computing inverse mask-dependent wavelets with the lifting algorithm requires using the binary mask to determine a polynomial for each mask-dependent wavelet.

15. The method of claim 14 wherein the wherein polynomial coefficients for each possible polynomial degree are stored in a lookup table.

16. The method of claim 10 wherein the binary mask is losslessy compressed prior to transmission over the network.

17. The method of claim 9 wherein the wherein polynomial coefficients for each possible polynomial less than a maximum degree are stored in a lookup table.

18. A computer-implemented process for compressing images, comprising using a computer to:
apply an image mask to an input image;
determine pixel availability in the input image by locating unmasked pixels in the input image;
using the determined pixel availability to change a wavelet function on a case-by-case basis for each unmasked pixel as a function of the image mask by using a polynomial of degree k−1 for interpolation in both a predict and update step of a multistage lifting algorithm where at least k unmasked neighboring pixel values are available for each stage of the lifting algorithm;
compute a wavelet for each unmasked pixel in the input image using each wavelet function having a polynomial of degree k−1 ; and
compressing the input image using the computed wavelets.

19. The computer-implemented process of claim 18 wherein inverse wavelets are computed as a function of the image mask and the compressed image.

20. The computer-implemented process of claim 19 wherein the compressed image is uncompressed using the inverse wavelets.

21. The computer-implemented process of claim 18 further comprising a polynomial coefficient lookup table comprising coefficients for all possible combinations of neighboring unmasked image pixels.

22. The computer-implemented process of claim 21 wherein the wavelet computed for each unmasked pixel is computed using appropriate coefficients from the polynomial coefficient lookup table.

23. The computer-implemented process of claim 21 wherein inverse wavelets are computed as a function of the image mask and the compressed image, using appropriate coefficients from the polynomial coefficient lookup table.

24. A computer-readable medium having computer executable instructions for generating invertible wavelets for compressing an input image, said computer executable instructions comprising:
applying a binary mask an input image;
determining which pixels in the input image are unmasked;
automatically determining a linear combination of a number of unmasked neighboring image pixels for each unmasked image pixel in the input image;
automatically computing a mask-dependent wavelet using a lifting algorithm having at least one stage for each unmasked pixel in the input image, wherein the mask-dependent wavelet computed for each pixel is computed using a polynomial having a degree no greater than one less than the number of unmasked neighboring pixels for each unmasked pixel in the input image for each lifting stage; and
automatically compressing the input image using the mask-dependent wavelets.

25. The computer-readable media of claim 24 wherein at least one two-dimensional wavelet is computed over the input image by computing a succession of one-dimensional wavelets over the image.

26. The computer-readable media of claim 24 further comprising a polynomial coefficient lookup table comprising coefficients for all possible combinations of neighboring unmasked image pixels.

27. The computer-readable media of claim 26 wherein the wavelet computed for each unmasked pixel is computed using appropriate coefficients from the polynomial coefficient lookup table.

28. The computer-readable media of claim 24 wherein the wavelets are inverted to generate inverse wavelets, and wherein the inverse wavelets are used to decode the encoded input image.

29. The computer-readable media of claim 28 wherein the binary mask is used to compute the inverse wavelets.

* * * * *